(12) United States Patent
Gregorio et al.

(10) Patent No.: US 8,972,489 B2
(45) Date of Patent: Mar. 3, 2015

(54) PROVIDING A CLIENT INTERFACE FOR A SERVER-BASED WEB APPLICATION PROGRAMMING INTERFACE

(75) Inventors: Joseph Charles Gregorio, Apex, NC (US); Monsur Hossain, Chicago, IL (US)

(73) Assignee: Google Inc., Mountain View, CA (US)

(*) Notice: Subject to any disclaimer, the term of this patent is extended or adjusted under 35 U.S.C. 154(b) by 205 days.

(21) Appl. No.: 13/297,088

(22) Filed: Nov. 15, 2011

(65) Prior Publication Data
US 2013/0124608 A1    May 16, 2013

(51) Int. Cl.
G06F 15/16    (2006.01)
G06F 9/44    (2006.01)
G06F 9/54    (2006.01)

(52) U.S. Cl.
CPC . *G06F 8/30* (2013.01); *G06F 9/547* (2013.01)
USPC ........... 709/203; 709/201; 709/202; 709/217; 709/218; 709/219

(58) Field of Classification Search
USPC ................................. 709/201–203, 217–219
See application file for complete search history.

(56) References Cited

PUBLICATIONS

NPL, Archer et al., "The Python Web Services Developer: The real world, Part 2", IBM developerWorks, Jan. 2004.*
NPL: Bertrand Portier, "Invoking web services with Java Clients", IBM developerWorks, Found at www.ibm.com/developerworks/webservices/library/ws-javaclient/, Nov. 2003.*
Adam Duvander: Google's API for APIs Makes Sense of Its 80+ Services, Progammable Web Blog, May 10, 2011, Retrieved by the ISA from the Internet on Jan. 11, 2013.
International Search Report mailed Jan. 31, 2013 for Application No. PCT/US2012/064816.
Lopyrev A. et al., "Google APIs Discovery Service: one API to find them all", The official Google code blog, May 9, 2011, Retrieved by the ISA from the Internet on Jan. 1, 2013.
Marc J. Hadley, "Web Application Description Language (WADL)", Feb. 2, 2009, Retrieved by the ISA from the Internet on Jan. 22, 2013.
Tabor R, "Microsoft .NET XML Web Services", Dec. 2001, Microsoft .NET XML Web Services, SAMS, pp. 1-63.
Written Opinion of the International Searching Authority mailed Jan. 31, 2013 for International Application No. PCT/US2012/064816.

* cited by examiner

*Primary Examiner* — Wing F Chan
*Assistant Examiner* — Padma Mundur
(74) *Attorney, Agent, or Firm* — Birch, Stewart, Kolasch & Birch, LLP

(57) ABSTRACT

Disclosed methods, systems, and articles of manufacture, including processor-readable mediums, relate to providing a client interface for a server-based web application programming interface (API). In a disclosed method, a client device receives a first discovery document that is represented in a first machine-readable language and that includes information describing a plurality of resources of a first API of a server device. Based at least in part on the first discovery document, the client device executes a first set of instructions represented in a second machine-readable language that is different from the first machine-readable language, to generate a first library that includes instructions represented in the second machine-readable language and that enables the client device to interface with at least one of the plurality of resources of the first API.

20 Claims, 8 Drawing Sheets

154a

```
1   {
2     "kind": "discovery#directoryList",
3     "items": [
4       ...
5       {
6         "kind": "discovery#directoryItem",
7         "id": "urlshortener:v1",
8         "name": "urlshortener",
9         "version": "v1",
10        "title": "URL Shortener API",
11        "description": "Lets you create, inspect, and manage goo.gl short URLs",
12        "discoveryLink": "./apis/urlshortener/v1/rest",
13        "icons": {
14          "x16": "http://www.google.com/images/icons/product/search-16.gif",
15          "x32": "http://www.google.com/images/icons/product/search-32.gif"
16        },
17        "documentationLink": "http://code.google.com/apis/urlshortener/v1/getting_started.html",
18        "labels": [
19          "labs"
20        ],
21        "preferred": true
22      },
23      ...
24    ]
25  }
```

```
1   import httplib2
2   import json
3   import uritemplate
4   import urlparse
5   import urllib 6   DISCOVERY = 'https://www.googleapis.com/discovery/v1/apis/urlshortener/v1/rest'
7   h = httplib2.Http()
8   resp, content = h.request(DISCOVERY)
9   discovery = json.loads(content)

10  BASE_URI = urlparse.urljoin(DISCOVERY, discovery['basePath'])

11  class Collection(object): pass 12  def createNewMethod(name, method):
13    def newMethod(**kwargs):
14      body = kwargs.pop('body', None)
15      url = urlparse.urljoin(BASE_URI, uritemplate.expand(method['path'], kwargs))
16      for pname, pconfig in method.get('parameters', {}).iteritems():
17        if pconfig['location'] == 'path' and pname in kwargs:
18          del kwargs[]pname]
19      if kwargs:
20        url = url + '?' + urllib.urlencode(kwargs)
21      return h.request(url, method=method['httpMethod'], body=body,
22                  headers={'content-type': 'application/json'})
23    return newMethod 24  def build(discovery, collection):
25    for name, resource in discovery.get('resoruces', {}).iteritems():
26      setattr(collection, name, build(resource, Collection()))
27    for name, method in discovery.get('methods', {}).iteritems():
28      setattr(collection, name, createNewMethod(name, method))
29    return collection 30  service = build(discovery, Collection())
31  print service.url.insert(body='{"longUrl": "http://www.google.com/"}')[]
```

FIG. 7

PROVIDING A CLIENT INTERFACE FOR A SERVER-BASED WEB APPLICATION PROGRAMMING INTERFACE

BACKGROUND

This disclosure relates to providing an interface between a client device and a server-based application programming interface (API).

An API is used in software engineering to access and communicate with one or more software programs. For example, an API can define a particular set of rules and specifications that a software program uses to communicate with another software program or hardware device. In this way, an API provides an interface between software programs, similar to the way a user interface facilitates interaction between a human and a computer.

An API can be created for an application, library, operating system, or the like, as a way of defining their vocabulary and resource request conventions (for example, function-calling conventions). An API can include specifications for routines, data structures, object classes, and protocols used to communicate between a consumer program and an implementer program of the API.

An API can act as an abstraction that describes an interface for an interaction with a set of functions used by components of a software program. The software providing the functions described by an API is said to be an implementation of the API.

The term "API" can refer to a complete interface, a single function, or a set of APIs. Therefore, the scope of its meaning is usually determined by the context of its usage.

There are approaches for representing an interface between a web service and an API. These approaches use technology such as XML (eXtended Markup Language) and WSDL (Web Services Description Language). Other technologies such as JSON (JavaScript Object Notation) and HTTPS (Hypertext Transfer Protocol Secure) offer efficient and effective ways to represent and transmit metadata about an API in machine-readable format, in order to facilitate development of client libraries, IDE plug-ins, and other tools for interacting with APIs.

SUMMARY

In an embodiment, a method comprises receiving, by a client device, a first discovery document that is represented in a first machine-readable language and that includes information describing a plurality of resources of a first application programming interface (API) of a server device. The method comprises, based at least in part on the first discovery document, executing, by the client device, a first set of instructions represented in a second machine-readable language that is different from the first machine-readable language, to generate a first library that includes instructions represented in the second machine-readable language and that enables the client device to interface with at least one of the plurality of resources of the first API.

In an embodiment, a tangible processor-readable medium stores instructions that, when executed, cause one or more processors to at least store a first discovery document that is represented in a first machine-readable language and that includes information describing a plurality of resources of a first application programming interface (API) of a server device. The instructions, when executed, cause the one or more processors to at least, based at least in part on the first discovery document, execute a first set of instructions represented in a second machine-readable language, to generate a first library that includes instructions represented in the second machine-readable language and that enables a client device to interface with at least one of the plurality of resources of the first API.

In an embodiment, a system comprises a retrieval unit configured to receive, by a client device, a first discovery document that is represented in a first machine-readable language and that includes information describing a plurality of resources of a first application programming interface (API) of a server device. The system of the embodiment comprises a library building unit configured to execute, by the client device, based at least in part on the first discovery document, a first set of instructions represented in a second machine-readable language that is different from the first machine-readable language, to generate a first library that includes instructions represented in the second machine-readable language and that enables the client device to interface with at least one of the plurality of resources of the first API.

BRIEF DESCRIPTION OF DRAWINGS

FIG. 4 illustrates an exemplary representation of a directory entry according to an embodiment.

FIG. 7 illustrates exemplary instructions that can be used to build a client library according to an embodiment.

DETAILED DESCRIPTION

System Overview

Figure 1:
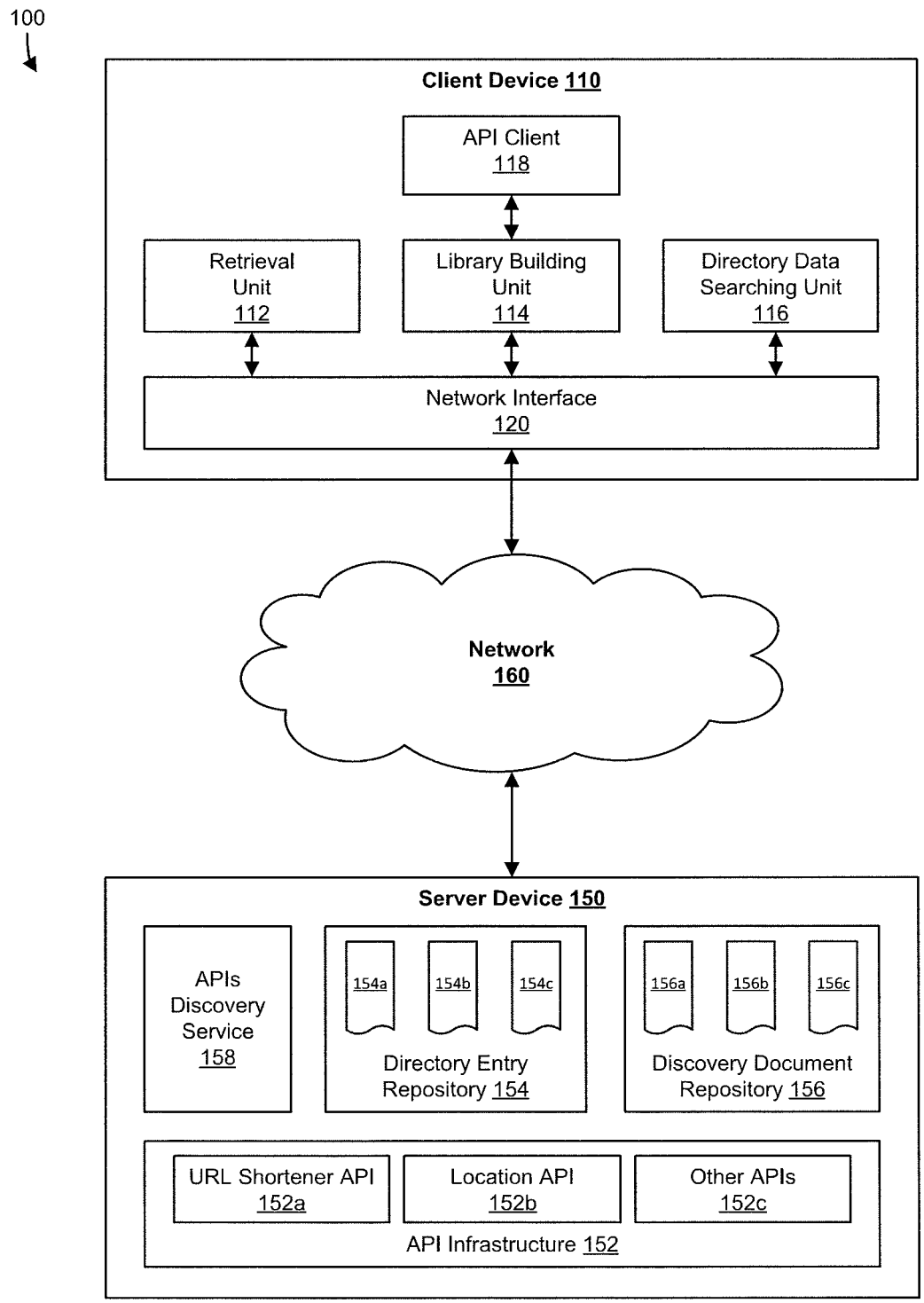
FIG. 1 illustrates an exemplary client-server system in which embodiments can operate.

FIG. 1 illustrates an exemplary client-server system 100 in which embodiments may operate. The client server system 100 includes a client device 110 and a server device 150 that are in communication with each other over a network 160. For simplicity of illustration, the illustrated client-server system 100 is shown to include a single client device 110 and a single server device 150. The system 100 may of course include a different number of client devices or server devices. The client device 110 and the server device 150 may be implemented by any suitable computing device, such as computing device 800 (to be discussed below in connection with FIG. 8).

The illustrated server device 150 includes an API infrastructure 152, which includes several APIs. In particular, the API infrastructure 152 includes a URL shortener API 152a, a location API 152b, and other APIs 152c. The APIs 152a-152c are shown as examples, and the API infrastructure 152 can have fewer, different, or additional APIs.

The server device 150 stores a directory entry repository 154. The illustrated directory entry repository 154 includes a directory entry 154a that corresponds to the URL shortener API 152a, a directory entry 154b that corresponds to the location API 152b, and directory entries 154c that correspond to the other APIs 152c. The server device 150 also stores a discovery document repository 156. The discovery document repository 156 includes a discovery document 156a that corresponds to the URL shortener API 152*a*, a discovery document 156*b* that corresponds to the location API 152*b*, and discovery documents 156*c* that correspond to the other APIs 152*c*. The format and contents of the directory entries 154*a*-154*c* and the discovery documents 156*a*-156*c* are discussed in greater detail below in connection with FIGS. 2 and 3.

The server device 150 includes an APIs discovery service 158. The APIs discovery service 158 is configured to access metadata in connection with the API infrastructure 152 to provide information about configurations of the APIs 152*a*-152*c*. This information is stored to the directory entry repository 154 and the discovery document repository 156. Various clients can access this information from the directory entry repository 154 and the discovery document repository 156. For example, the API client 118 can access information about configurations of the APIs 152*a*-152*c* by using retrieval unit 112 and directory data searching unit 116.

With continued reference to FIG. 1, the illustrated client device 110 includes a retrieval unit 112, a library building unit 114, a directory data searching unit 116, and an API client 118 that can communicate with the server device 150 via a network interface 120. The retrieval unit 112 operates in conjunction with the directory data searching unit 116 to retrieve information from the directory entry repository 154 and the discovery document repository 156 in the server device 150. The library building unit 114 can produce client libraries based on the discovery documents 152*a*-152*c*.

As mentioned, the illustrated client device 110 and the server device 150 communicate with each other over the network 160. The network 160 can be the Internet, a local area network, mobile phone network, or any other network of machines with which the client-server system 100 exchanges data.

Directory Entry and Discovery Document

Figure 2:
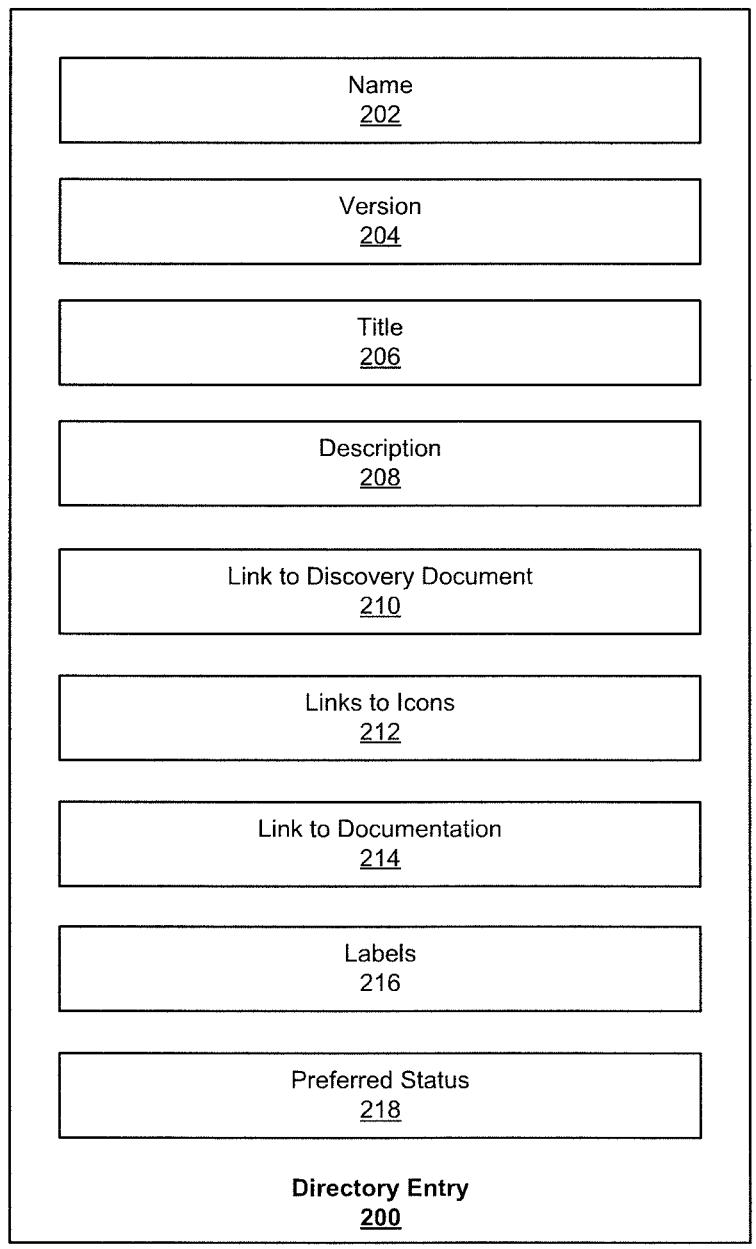
FIG. 2 illustrates an exemplary listing of a directory entry according to an embodiment.

FIG. 2 illustrates an exemplary listing 200 of a directory entry according to an embodiment. The directory entry listing 200 shows a format of the directory entries 154*a*-154*c* (illustrated in FIG. 1) according to an embodiment. In other embodiments, the directory entries 154*a*-154*c* can have a different format. The illustrated directory entry listing 200 includes several fields, including a name 202, a version 204, a title 206, a description 208, a link 210 to a discovery document, a link 212 to an icon, a link 214 to documentation, labels 216, and preferred status 218. The directory entry listing 200 can include fewer, more, or different fields than those shown.

Figure 3:
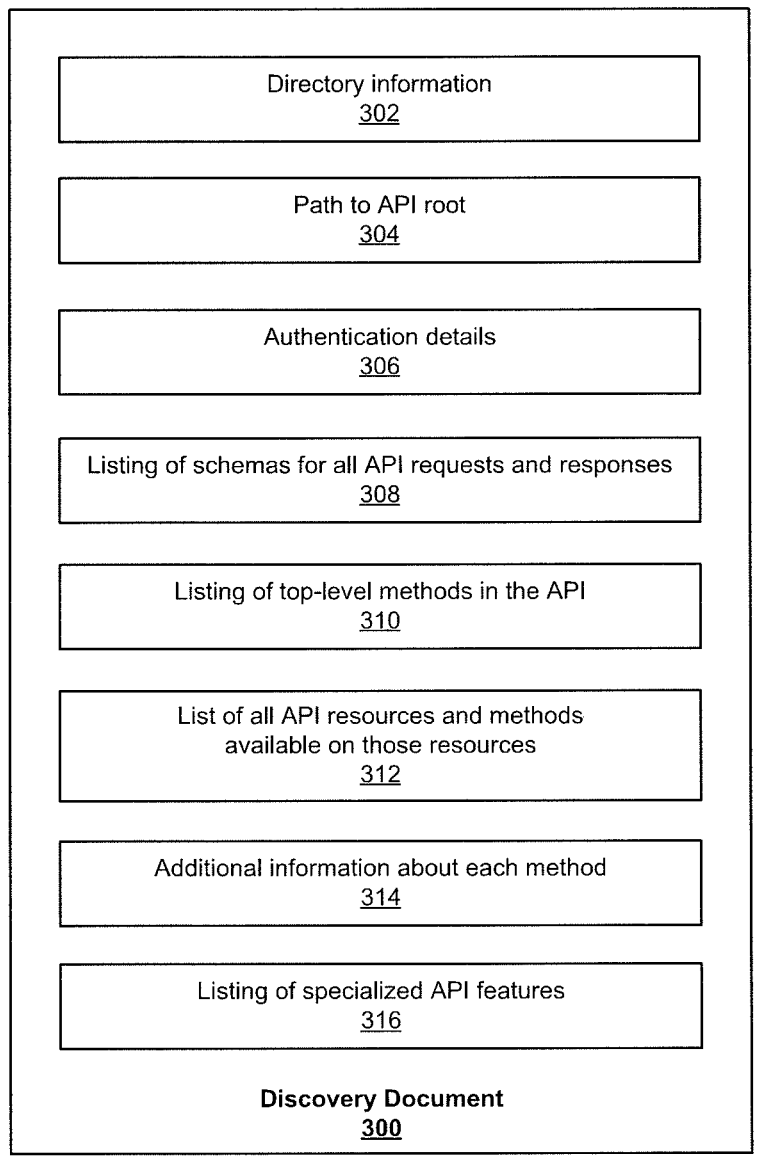
FIG. 3 illustrates an exemplary listing of a discovery document according to an embodiment.

FIG. 3 illustrates an exemplary listing 300 of a discovery document according to an embodiment. The discovery document listing 300 represents the format of each of the discovery documents 156*a*-156*c* (illustrated in FIG. 1) according to an embodiment. In other embodiments, the discovery documents 156*a*-156 can have a different format. The illustrated discovery document listing 300 includes several fields, including directory information 302, a path 304 to an API root, authentication details 306, a listing 308 of schemas for all API requests and responses, a listing 310 of top-level methods in the API, a list 312 of all API resources and methods available on those resources, additional information 314 about each method, and a listing 316 of specialized API features. The discovery document listing 300 can include fewer, more, or different fields than those shown.

In an embodiment, the directory entries 154*a*-154*c* and the discovery documents 156*a*-156*c* are formatted in the JSON (JavaScript Object Notation) language. Although an embodiment uses JSON, other embodiments can use other machine-readable languages, such as, for example, XML (eXtensible Markup Language). The following section discloses JSON-formatted examples of a directory entry and a discovery document.

Example of a JSON-Formatted Directory Entry

JSON provides a simple way to represent arbitrary data structures. JSON uses a text format that is language-independent and uses conventions that are familiar to programmers of C, C++, C#, Java, JavaScript, Perl, Python, and others. RFC 4627 defines the JSON format.

FIG. 4 illustrates a JSON representation of the directory entry 154*a* illustrated in FIG. 1, according to an embodiment. With reference to FIGS. 1 and 4, the directory entry 154*a* includes metadata in connection with the URL shortener API 152*a*. The JSON representation of the directory entry 154*a* shown in FIG. 4 is a portion of a larger document called an API directory. The API directory includes not only the directory entry 154*a* corresponding to the URL shortener API 152*a*, but also directory entries corresponding to other APIs (for example, the directory entries 154*b* and 154*c*). To provide clarity, the other directory entries have been omitted from the illustration in FIG. 4. Although an embodiment provides an API directory that includes multiple directory entries, in another embodiment, each directory entry constitutes its own document.

With reference to FIG. 1, in an embodiment, the retrieval unit 112 can access the directory entry 154*a* by executing the following unauthenticated HTTP GET request: "GET https://www.googleapis.com/discovery/v1/apis". In response to the GET request, the retrieval unit 112 receives the JSON-representation of the API directory that includes the directory entry 154*a*. As mentioned above, FIG. 4 illustrates the JSON representation of the directory entry 154*a*, which includes information about the URL shortener API 152*a*. In FIG. 4, line numbers have been provided to aid in explaining the contents of the JSON directory entry 154*a*.

With reference to FIG. 4, the directory entry 154*a* includes several types of information about the URL shortener API 152*a*. These information types include identification information (lines 8-11), discovery information (line 12), documentation information (lines 13-17), and status information (lines 18-21). The identification information includes a name "url shortener" (line 8), a version "v1" (line 9), a title "URL shortener API" (line 10), and a description "Lets you create, inspect, and manage goo.gl short URLS" (line 11). The discovery information is a discovery document link "./apis/urlshortener/v1/rest" (line 12). This link is a relative URI (Uniform Resource Identifier) that provides access to the discovery document 156*a* (shown in FIG. 1) that corresponds to the directory entry 154*a*. The documentation information includes a link to icons (lines 13-16) that correspond to the URL shortener API 152*a* and a link to documentation (line 17) that explains aspects of the URL shortener API 152*a*. The status information of the directory entry 154*a* includes labels and preferred fields (lines 18-21).

Example of a JSON-Formatted Discovery Document

This section explores the format of an exemplary discovery document in greater detail. The example discussed below refers to the URL shortener API 152*a*. The syntax used in this example is purely for illustrative purposes, and embodiments are not limited to this syntax. The following discussion is meant to provide a general overview of the sections of the discovery document that are relevant to this disclosure.

The discovery document begins with a set of API-specific properties, as follows:

```
"kind": "discovery#restDescription",
"name": "urlshortener",
"version": "v1",
"title": "Lets you create, inspect, and manage goo.gl short URLs",
"description": "Lets you create, inspect, and manage goo.gl short URLs",
"protocol": "rest",
"basePath": "/urlshortener/v1/"
```

These properties include details about the URL shortener API 152*a*. Notably, the "basePath" field indicates the path prefix for this particular API version.

In an embodiment, the operation of an API acts on data objects called resources. The discovery document is built on the concept of resources. The discovery document has a top-level resources section that groups all the resources associated with the API. For example, the URL shortener API has a "url" resource.

Inside each resource section are the methods associated with that resource. For example, in a JSON embodiment, the URL shortener API 152*a* has three methods associated with the URL resource: "get", "list", and "insert".

The discovery document also includes schema information. A schema describes what the resources in an API look like. The discovery document has a top-level schema section, which contains a name-value pair of schema ID to object. Schema IDs are unique for each API and are used to uniquely identify the schema in the methods section of the discovery document.

The discovery document is built around methods. Methods are operations that can be performed on an API and are included in the discovery document. The methods section may be found in various areas of the discovery document, including at the top level (API-level methods) or at the resources level (resource-level methods). The following is a JSON-formatted example of the "get" method:

```
"get": {
    "id": "urlshortener.url.get",
    "path": "url"
    "httpMethod": "GET",
    "description": "Expands a short URL or gets creation time and analytics.",
    "response": { "$ref": "Url"},
    "parameters": { // parameters related to the method },
}
```

This method contains general details such as a unique "id" to identify the method, the "httpMethod" to use, and the "path" of the method. If a method has a request or response body, these are documented in the discovery document. For example, in the "get" method above, the "response" syntax indicates that the response body is defined by a JSON schema with an id of "Url". This schema can be found in the top-level schemas section of the discovery document. Both request and response bodies can use the "$ref" syntax for referring to schemas.

If a method has parameters that are to be specified by a user, the discovery document documents these parameters in a method-level parameters section. This section can contain a key-value mapping of the parameter name to further details of that parameter. For example, the following JSON code is a parameter section:

```
"parameters": {
    "shortUrl": {
```

```
        "type": "string",
        "description": "The short URL, including the protocol.",
        "required": true,
        "location": "query"
    },
    projection": { ... }
},
"parameterOrder": [
    "shortUrl"
],
```

In this example, there are two parameters for the "get" method: shortUrl and projection. A parameter can go in either the path or the URL query; the location property indicates where the client library should put the parameters.

Building a Client Library

Figure 5:
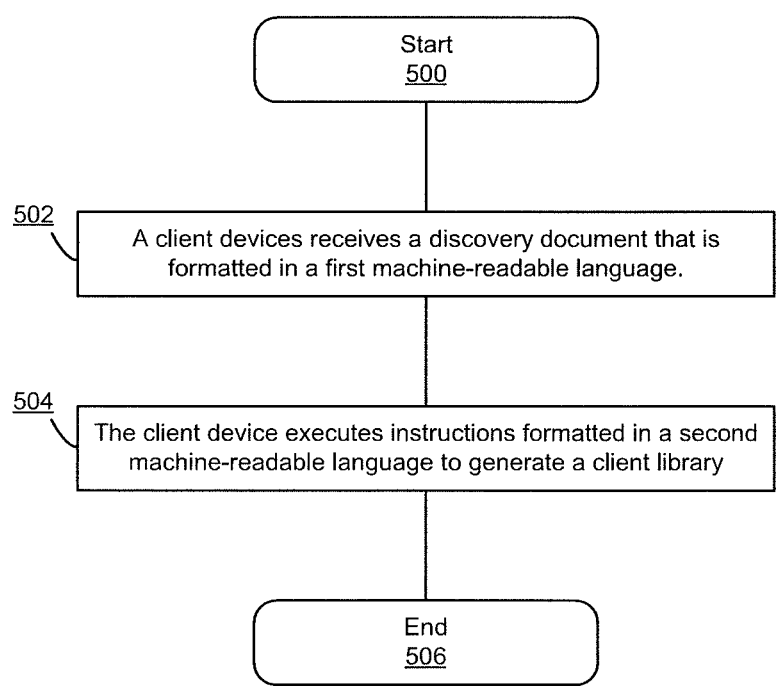
FIG. 5 illustrates an exemplary method for building a client library according to an embodiment.

FIG. 5 illustrates an exemplary method for building a client library according to an embodiment. The method begins at stage 500. At stage 502, a client device receives a discovery document that is formatted in a first machine-readable language. The discovery document includes information that describes resources of a first API of a server device. For example, with reference to the embodiment illustrated in FIG. 1, the retrieval unit 112 of the client device 110 retrieves the discovery document 156*a* from the discovery document repository 156 of the server device 150. In an embodiment, the discovery document 156*a* is formatted in JSON. As mentioned, the discovery document 156*a* includes information that describes resources of the URL shortener API 152*a*.

At stage 504, the client device executes instructions that are formatted in a second machine-readable language. This generates a library that includes instructions that are formatted in a second machine-readable language. The library enables the client device to interface with the API of the server device. For example, with reference to the embodiment illustrated in FIG. 1, the library building unit 114 generates a library that enables the API client 118 of the client device 110 to interface with one of the APIs 152*a*-152*c* of the server device 150.

The method of FIG. 5 ends at stage 506.

Figure 6:
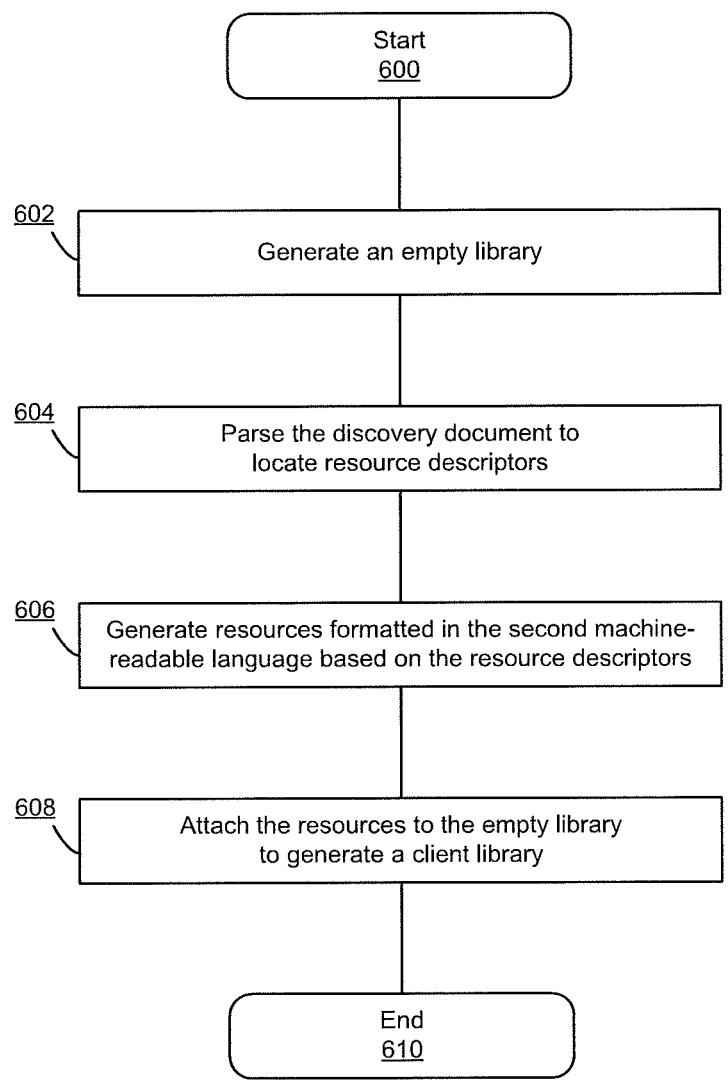
FIG. 6 illustrates an aspect of the method shown in FIG. 5 according to an embodiment.

FIG. 6 illustrates a general method for carrying out stage 504 of FIG. 5, according to an embodiment. The method of FIG. 6 begins at stage 600. Stage 602 involves generating an empty client library. For example, with reference to the embodiment illustrated in FIG. 1, the library building unit 114 generates an empty client library.

Stage 604 involves parsing the discovery document to locate resource descriptors. For example, the library building unit 114 can parse the discovery document 156*a* to identify resource descriptors in the discovery document 156*a*.

Stage 606 involves generating resources that are formatted in the second machine-readable language. This is done based on the resource descriptors. For example, the library building unit 114 can generated resources based on resource descriptors in the discovery document 156*a*.

Stage 608 involves attaching the resources to the empty client library to generate the client library. For example, the library building unit 114 can attach resources formatted in the second machine-readable language to the empty client library to generate a client library that enables the client device 110 to interface with the URL shortener API 152*a* of the server device 150.

The method of FIG. 6 ends at stage 610.

In carrying out the method of FIG. 6, there are some considerations that should be taken into account. One consideration is the time when the stages 602, 604, 606, and 608 are to be carried out. In one embodiment, the second machine-readable language is a dynamically typed language such as Python. This means that creation of the programming structures to interface with APIs on the server device 150 can be lazily constructed during the runtime execution phase.

Python-Based Example of Building a Client Library

FIG. 7 illustrates exemplary instructions 700 that can be used to build a library according to the methods illustrated and described in connection with FIGS. 5 and 6. The instructions 700 are formatted in Python. The Python instructions 700 enable the client device 110 to receive the discovery document 156a and, based on the discovery document 156a, to interface with the URL shortener API 152a of the server device 150. Because Python is a dynamically typed language, the Python instructions 700 enable the library building unit 114 of the client device 100 to fetch the discovery document 156a and to generate the library during a runtime phase of execution of the Python instructions 700. Line numbers are provided to aid in explaining the features of the Python instructions 800.

Lines 1-5 of the instructions 700 import several libraries that carry resources to be used by the Python code 700. Line 6 retrieves the discovery document 156a that corresponds to the URL shortener API 152a. Notably, the instructions 700 directly retrieve the discovery document 156a without retrieving a directory entry. As illustrated, the discovery document 156a is received from the URL "https://www.googleapis.com/discovery/v1/apis/urlshortener/v1/rest". In lines 7-9, the request body of the discovery document is converted to Python format.

Line 10 defines a base URI for the URL shortener API 152a. Lines 12-23 compose a request. When a method is called on a collection, the URI template is expanded with the parameters passed into the method, and parameters with a location of "query" are put into the query parameters of the URL. Finally, a request is sent to the composed URL using the HTTP method specified in the discovery document 156a.

Lines 24-29 build the client library surface by recursively descending over the parsed discovery document 156a. For each method in the methods section, a new method is attached to the "collection" object. Because collections can be nested, the instructions look for resources and recursively build the collection object for all of its members if any are found. Each nested collection is also attached to the collection object as an attribute.

Lines 30-31 demonstrate how the built API client library surface is used. First, a service object is built from the discovery document 156a. Then, a long URL (www.google.com) is inserted into the URL collection of the URL shortener API 152a. The URL shortener API 152a generates a short URL based on the long URL.

For example, when the Python instructions 700 are executed, the following response is returned:

```
{
    "kind": "urlshortener#url",
    "id": http://goo.gl/fbsS,
    "longurl": http://www.google.com/
}
```

In this response, "kind" indicates the API service ("urlshortener") and the method resource ("url") in the API service, "id" indicates the short URL ("http://goo.gl/fbsS") that the URL shortener API 152a outputs, and "longurl" indicates the long URL ("http://www.google.com/") that was provided by the Python instructions 700 as an input to the URL shortener API 152a.

In an embodiment, the Python instructions 700 can receive the name and version of a second API, along with any parameters that are to be used as inputs to the second API. For example, the Python instructions 700 can receive the name and version of the location API 152b, along with a specified version and any parameters to be inputted to the location API 152b. In this way, a common set of Python instructions 700 can be used to enable the client device 110 to interface with multiple APIs of the server device 150.

Example Computing Device

Figure 8:
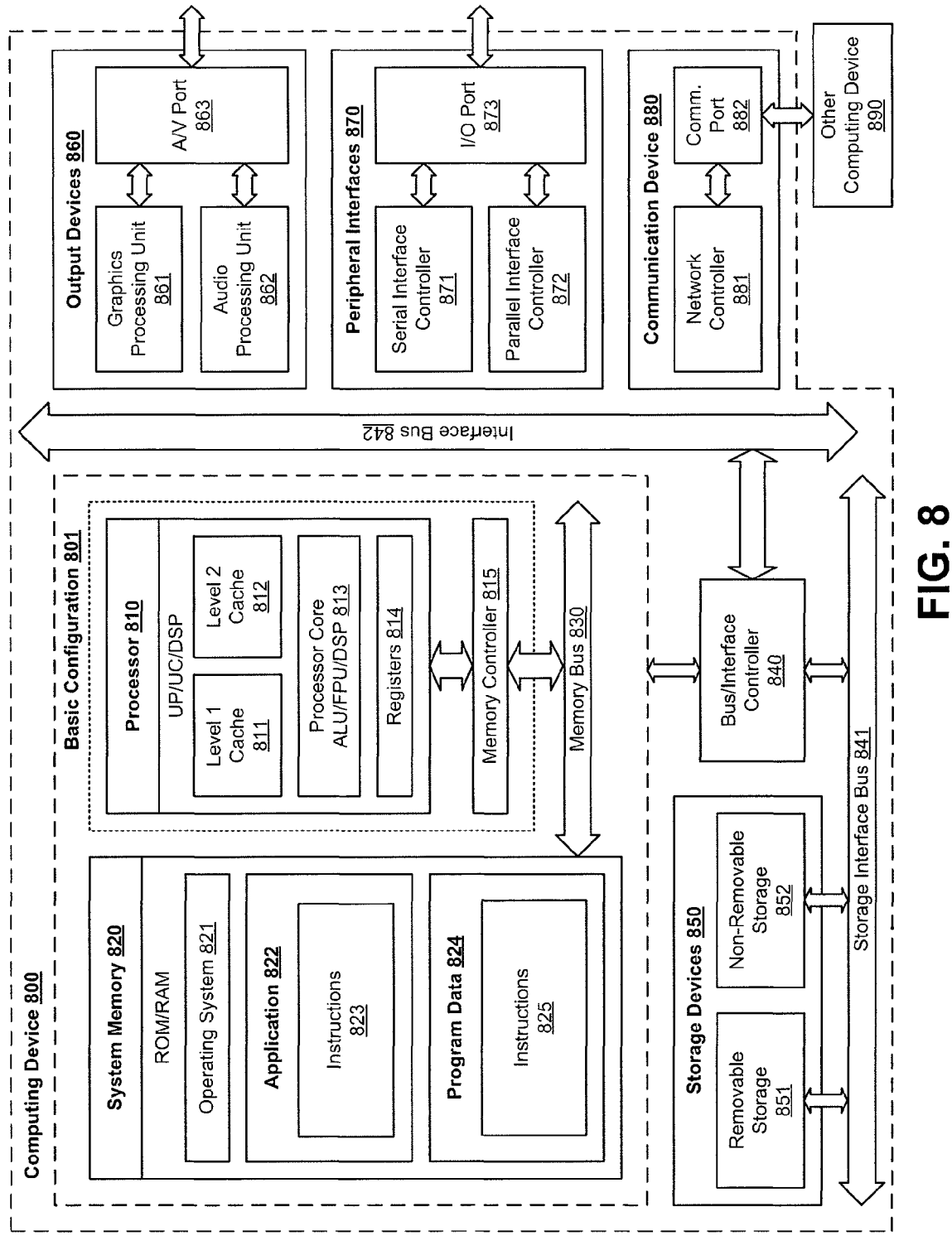
FIG. 8 is a block diagram illustrating an example computing device according to one or more embodiments.

FIG. 8 is a block diagram illustrating an example computing device 800 that can be used in accordance with one or more embodiments of the present disclosure. For example, the client device 110, the server device 150, or both can be implemented by the computing device 800. In a basic configuration 801, the computing device 800 includes a processor 810 and system memory 820. A memory bus 830 can be used for communicating between the processor 810 and the system memory 820.

The processor 810 can be of any type, including but not limited to a microprocessor (µP), a microcontroller (µC), a digital signal processor (DSP), or any combination of these. The processor 810 can include one or more levels of caching, such as a level-one cache 811 and a level-two cache 812, a processor core 813, and registers 814. The processor core 813 can include an arithmetic logic unit (ALU), a floating point unit (FPU), a digital signal processing core (DSP Core), or any combination of these. A memory controller 815 can also be used with the processor 810, or the memory controller 815 can be an internal part of the processor 810.

The system memory 820 can be of any type, including but not limited to volatile memory (for example, RAM), non-volatile memory (for example, ROM or flash memory) or any combination of these. The system memory 820 can include an operating system 821, one or more applications 822, and program data 824.

The computing device 800 can have additional features, functionality, or interfaces to facilitate communications between the basic configuration 801 and any devices. For example, a bus/interface controller 840 can be used to facilitate communications between the basic configuration 801 and one or more data storage devices 850 via a storage interface bus 841. The data storage devices 850 can be removable storage devices 851, non-removable storage devices 852, or any combination of these. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), tape drives, and the like. Example computer storage media can include volatile and nonvolatile, removable and non-removable media implemented in any method or technology for storage of information, such as computer readable instructions, data structures, program modules, or other data.

The system memory 820, removable storage 851 and non-removable storage 852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by the computing device 800. Any suitable computer storage media can be part of the computing device 800.

The computing device 800 can also include an interface bus 842 for facilitating communication from various interface devices (for example, output interfaces, peripheral interfaces, or communication interfaces) to the basic configuration 801 via the bus/interface controller 840. Example output devices 860 include a graphics processing unit 861 and an audio processing unit 862, either or which can be configured to communicate to various external devices such as a display or speakers via one or more A/V ports 863. Example peripheral interfaces 870 include a serial interface controller 871 or a parallel interface controller 872, which can be configured to communicate with external devices such as input devices (for example, a keyboard, mouse, pen, voice input device, or touch input device) or other peripheral devices (for example, a printer or scanner) via one or more of the I/O ports 873. An example communication device 880 includes a network controller 881, which can be arranged to facilitate communications with one or more other computing devices 890 over a network communication (not shown) via one or more of the communication ports 882. The communication connection is one example of a communication media. Communication media may typically be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. Communication media includes wired media such as a wired network or direct-wired connection, and wireless media such as acoustic, radio frequency (RF), and infrared (IR). A computer readable medium includes a storage medium and a communication medium.

The computing device 800 can be implemented as a portion of a small-form factor portable electronic device such as a cell phone, a personal data assistant (PDA), a personal media player device, a wireless web-watch device, a personal headset device, an application specific device, or a hybrid device that include any of these functions. The computing device 800 can also be implemented as a personal computer including both laptop computer and non-laptop computer configurations.

The disclosed embodiments can be implemented via application specific integrated circuits (ASICs), field programmable gate arrays (FPGAs), digital signal processors (DSPs), or other integrated formats. The disclosed embodiments can be implemented in integrated circuits, as any number of computer programs running on one or more computers, or as firmware.

While embodiments have been disclosed, these embodiments are meant to illustrate and are not intended to be limiting, with the true scope and spirit being indicated by the following claims.

We claim:

1. A method comprising:
   receiving, by a client device application, a first discovery document that is represented in a first machine-readable language and that includes:
   information describing a plurality of resources of an application programming interface (API) of a server device; and
   details regarding how to access the plurality of resources of the API via representational state transfer (RESTful) hypertext transfer protocol (HTTP) calls; and
   generating, at runtime of the application, a library containing objects and methods, the library is built by:
   recursively descending over the received machine-readable discovery document to identify at least one resource in the plurality of resource of the API;
   composing at least one request to obtain the at least one resource of the plurality of resources of the API via a RESTful HTTP call; and
   deserializing a response from the at least one request into a second machine-readable programming language.

2. The method of claim 1, further comprising making a call to the first API using the library.

3. The method of claim 1, further comprising:
   during a runtime of the application:
   generating an empty client library;
   parsing the discovery document to locate a plurality of resource descriptors, the resource descriptors describing respective resources of the API; and
   based at least in part on the plurality of resource descriptors, generating a plurality of resources represented in the second machine-readable language and attaching the plurality of resources to the empty client library, to generate the library.

4. The method of claim 1, wherein the first machine-readable language is JavaScript Object Notation (JSON).

5. The method of claim 1, wherein the second machine-readable language is Python.

6. The method of claim 1, wherein the first discovery document is stored to the server device.

7. A tangible non-transitory processor-readable medium storing instructions that, when executed, cause one or more processors to at least:
   store a discovery document that is represented in a first machine-readable language and that includes information describing a plurality of resources of a first application programming interface (API) of a server device and details regarding how to access the plurality of resources of the API via representational state transfer (RESTful) hypertext transfer protocol (HTTP) calls; and
   generate, at runtime of an application, a library containing objects and methods, the library is built by:
   recursively descending over the received machine-readable discovery document to identify at least one resource in the plurality of resources of the API;
   composing at least one request to obtain the at least one resource of the plurality of resources of the API via a RESTful HTTP call; and
   deserializing a response from the at least one request into a second machine-readable programming language.

8. The non-transitory processor-readable medium of claim 7, wherein the one or more processors are to, during a runtime phase of the application:
   generate an empty client library;
   parse the discovery document to locate a plurality of resource descriptors, each resource descriptor describing a respective resource of the API; and
   based at least in part on the plurality of resource descriptors, generate a plurality of resources represented in the second machine-readable dynamic programming language and attach the plurality of resources to the empty client library, to generate the library.

9. The non-transitory processor-readable medium of claim 7, wherein the first machine-readable language is JavaScript Object Notation (JSON).

10. The non-transitory processor-readable medium of claim 7, wherein the second machine-readable dynamic programming language is Python.

11. The non-transitory processor-readable medium of claim 7, wherein the discovery document is stored to the server device.

12. A method comprising:
   executing, by a client device application, a set of instructions that is represented in a first machine-readable dynamic programming language, and that is based at least in part on a reference to a discovery document represented in a second-machine readable language and including information describing a plurality of resources of an application programming interface (API) of a server device; and
   details regarding how to access the plurality of resources of the API via representational state transfer (RESTful) hypertext transfer protocol (HTTP) calls; and
   responsive to executing the set of instructions, generating, at runtime of the application, by the client device, a library containing objects and methods, the library is built by:
      recursively descending over the received machine-readable discovery document to identify at least one resource in the plurality of resources of the API;
      composing at least one request to obtain the at least one resource of the plurality of resources of the API via a RESTful HTTP call; and
      deserializing a response from the at least one request into the first machine-readable programming language.

13. The method of claim 12, further comprising receiving, by the client device, the discovery document.

14. The method of claim 12, wherein the second machine-readable language is JavaScript Object Notation (JSON).

15. The method of claim 12, wherein the reference to the discovery document is a Uniform Resource Identifier.

16. A tangible non-transitory processor-readable medium storing instructions that, when executed, cause one or more processors to at least:
   execute an application that is represented in a first machine-readable dynamic programming language, and that is based at least in part on a reference to a discovery document represented in a second-machine readable language and including information describing a plurality of resources of an application programming interface (API) of a server device and details regarding how to access the plurality of resources of the API via representational state transfer (RESTful) hypertext transfer protocol (HTTP) calls; and
   responsive to executing the application, generate, at runtime of the application, a library containing objects and methods, the library is built by:
   recursively descending over the received machine-readable discovery document to identify at least one resource in the plurality of resources of the API;
   composing at least one request to obtain the at least one resource of the plurality of resources of the API via a RESTful HTTP call; and
   deserializing a response from the at least one request into the first machine-readable programming language.

17. A tangible non-transitory processor-readable medium storing instructions that, when executed, cause one or more processors to at least:
   during a runtime phase of an application:
      generate an empty client library;
      parse a discovery document that is represented in a first machine-readable language and that includes information describing a plurality of resources of an application programming interface (API) of a server device, to locate a plurality of resource descriptors that each describes a respective one of the plurality of resources of the API; and details regarding how to access the plurality of resources of the API via representational state transfer (RESTful) hypertext transfer protocol (HTTP) calls; and
      based at least in part on the plurality of resource descriptors, generate a plurality of resources represented in the second machine-readable language and attach the plurality of resources to the empty client library, to generate a library containing objects and methods, the library is built by recursively descending over the received machine-readable discovery document to identify at least one resource in the plurality of resources of the API;
      composing at least one request to obtain the at least one resource of the plurality of resources of the API via a RESTful HTTP call; and
      deserializing a response from the at least one request into a second machine-readable programming language.

18. A tangible non-transitory processor-readable medium storing instructions that, when executed, cause one or more processors to at least, during a runtime phase of an application:
   responsive to receiving a reference to a first discovery document that is represented in a first machine-readable language and that includes information describing a plurality of resources of an application programming interface (API) of a server device and details regarding how to access the plurality of resources of the API via representational state transfer (RESTful) hypertext transfer protocol (HTTP) calls:
   parse the first discovery document to locate a first plurality of resource descriptors that each describes a respective one of the plurality of resources of the first API,
   compose at least one request to obtain at least one resource of the plurality of resources of the API via a RESTful HTTP call, and
   deserialize a response from the at least one request into a second machine-readable dynamic programming language and attach the first plurality of resources to a first empty client library to generate a first library, containing objects and methods that includes instructions represented in a second machine-readable dynamic programming language and that enables a client device to interface with the first API; and
   responsive to receiving a reference to a second discovery document that is represented in the first machine-readable language and that includes information describing a plurality of resources of a second API of the server device and details regarding how to access the plurality of resources of the second API via a RESTful HTTP calls:
   parse the second discovery document to locate a second plurality of resource descriptors that each describes a respective one of the plurality of resources of the second API,
   compose at least one request to obtain at least one resource of the plurality of resources of the API via a RESTful HTTP call, and
   deserialize a response from the at least one request into a second plurality of resources represented in the second machine-readable dynamic programming language and attach the second plurality of resources to a second empty client library to generate a second library, containing objects and methods, that includes instructions represented in the second machine-readable dynamic programming language and that enables the client device to interface with the first API.

19. A system comprising:
one or more processing devices and
one or more storage devices storing instructions that, when executed by the one or more processing devices, cause the one or more processing devices to:
receive a discovery document that is represented in a first machine-readable language and that includes information describing a plurality of resources of an application programming interface (API) of a server device and details regarding how to access the plurality of resources of the API via representational state transfer (RESTful) hypertext transfer protocol (HTTP) calls; and
execute, a set of instructions represented in a second machine-readable dynamic programming language that is different from the first machine-readable language, to generate, at runtime of an application, a library containing objects and methods, the library is built by:
recursively descending over the received machine-readable discovery document to identify at least one resource in the plurality of resources of the API;
composing at least one request to obtain the at least one resource of the plurality of resources of the API via a RESTful HTTP call; and
deserializing a response from the at least one request into the second machine-readable programming language.

20. A system comprising:
one or more processing devices and
one or more storage devices storing instructions that, when executed by the one or more processing devices, cause the one or more processing devices to:
execute a set of instructions that is represented in a first machine-readable language, and that is based at least in part on a reference to a discovery document represented in a second-machine readable language and including information describing a plurality of resources of an application programming interface (API) of a server device and details regarding how to access the plurality of resources of the API via representational state transfer (RESTful) hypertext transfer protocol (HTTP) calls; and
generate, by the client device at runtime of the application, responsive to executing the first set of instructions, a library containing objects and methods, the library is built by:
recursively descending over the received machine-readable discovery document to identify at least one resource in the plurality of resources of the API;
composing at least one request to obtain the at least one resource of the plurality of resources of the API via a RESTful HTTP call; and
deserializing a response from the at least one request into the first machine-readable programming language.

\* \* \* \* \*